March 17, 1959

J. KAHN 2,878,037

COMBINED INDEX AND BOOK HOLDER FOR TELEPHONE DIRECTORIES AND THE LIKE

Filed Aug. 30, 1955

INVENTOR.
Joseph Kahn.
BY Robert L. Kahn
Atty.

United States Patent Office 2,878,037

Patented Mar. 17, 1959

2,878,037

COMBINED INDEX AND BOOK HOLDER FOR TELEPHONE DIRECTORIES AND THE LIKE

Joseph Kahn, Chicago, Ill.

Application August 30, 1955, Serial No. 531,450

2 Claims. (Cl. 281—15)

This invention relates to a combined index and book holder for telephone directories and similar bulky books which appear at periodic intervals.

Many bulky books, such as unabridged dictionaries and the like which are sold to the public, are generally manufactured with indentations in the page edges so that a letter index is provided. Thus any section of a dictionary referring to a particular letter or letters may be quickly located.

Certain books, such as for example telephone directories, are issued gratis to subscribers. Consequently such books are usually lacking the letter index means probably because of the added expense involved in the manufacture of the book. It is well known that telephone directories for large cities such as the boroughs of New York city, Chicago, Boston and other metropolitan cities have directories having a thickness of between 2" and 3" and containing as many as 2,000 and more pages. The pages of such directories are usually of thin paper. Consequently some difficulty and delay is encountered in opening the directory to a desired letter.

This invention makes it possible to provide a holder for a bulky telephone directory or similar book, such holder incorporating a means which functions as a handy index means for separating the book into index sections corresponding to predetermined letters of the alphabet as one example. In its simplest form, a structure embodying the invention is based upon the assumption that the thickness of the book, such as a telephone directory, will remain generally constant within limits and that the index sections or subdivisions within limits will also remain constant with various issues of the directory. A structure embodying the present invention is sufficiently simple so that in the event a particular construction becomes obsolete, due to a great change in thickness of a telephone book, it will be possible to discard the obsolete construction and design a new structure that may be sold at a moderate price.

While the invention may be applied to bulky books lacking an index other than telephone directories, a substantial field of application is in connection with large telephone directories.

The invention may best be disclosed in connection with the drawings showing an exemplary form thereof, it being understood, however, that variations may be made without departing from the scope thereof except as defined by the appended claims. Referring to the drawings, Figure 1 is a perspective view of one embodiment of the invention.

Figures 2 and 3 are sections along line 2—2 and 3—3 of Figure 1.

Figures 1, 2, 3, 4, 5, 6, 7:
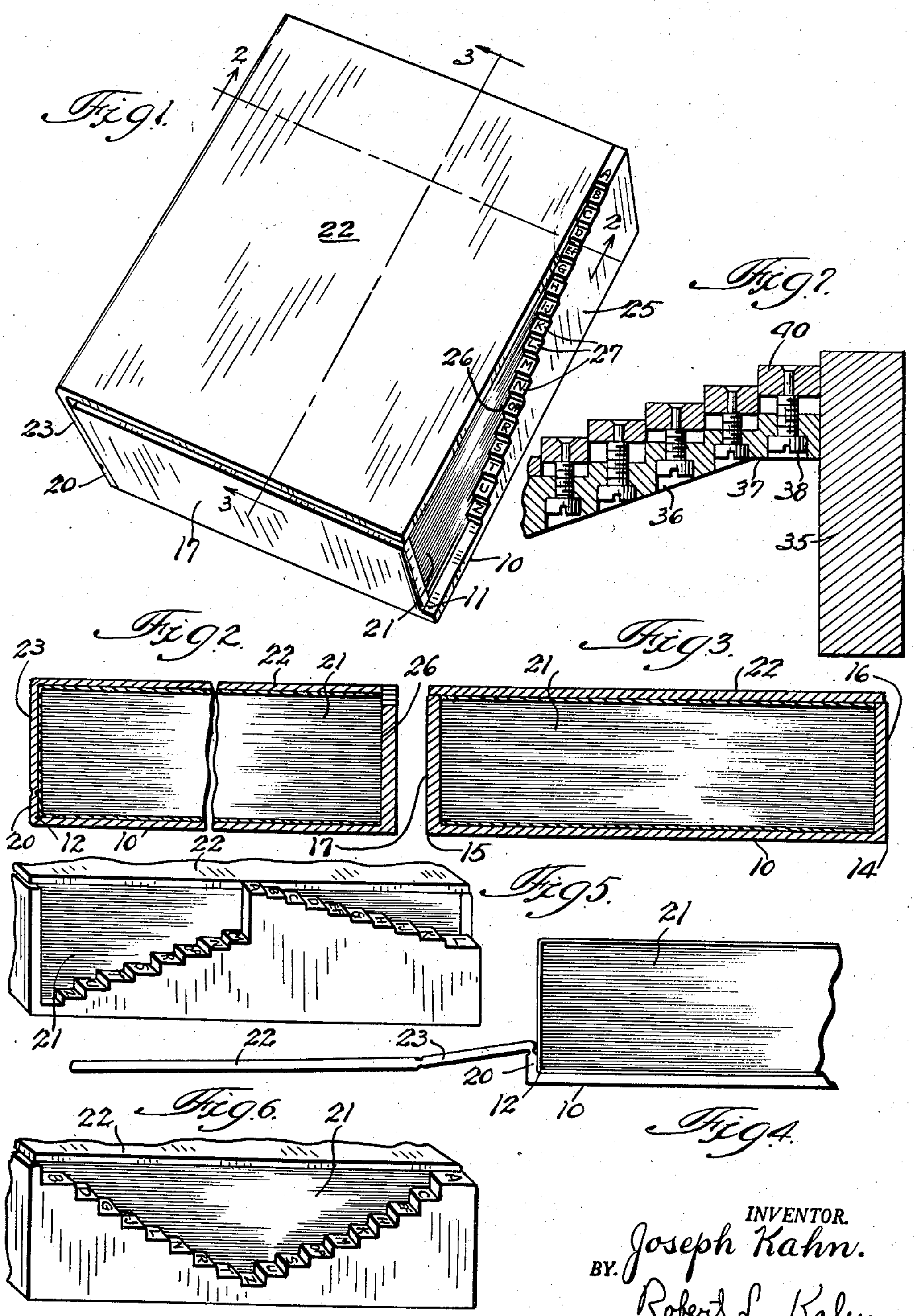
Figure 4 is a detail of the new index and book holder with the cover open.
Figures 5 and 6 are respectively details of modified forms of the invention.
Figure 7 shows a detail of a means for manufacturing the stepped portion of the index and book holder.

Referring first to Figures 1 to 4 inclusive of the drawings, the new index book holder comprises base panel 10 having outer and inner edges 11 and 12 and top and bottom edges 14 and 15. Rigidly attached to base or bottom 10 are walls 16 and 17 adjacent top and bottom edges 14 and 15 and forming top and bottom walls.

Inner edge 12 of base 10 may be provided with step or shoulder portion 20 extending between top and bottom edges 14 and 15. The height of shoulder portion 20 above base 10 may vary within wide limits and should be enough to provide a retaining ledge for the bound edge of telephone directory 21 or other volume to be accommodated when the book is closed and rests upon its rear cover. Preferably, cover 22 and portion 23 may be hinged to edge 12 of base 10, cover 22 being provided to complete the enclosure. Cover 22 may be omitted if desired.

In accordance with the present invention, outer edge 11 of base 10 is provided with stepped index means 25 so disposed as to lie against side 26 of the directory to be accommodated. Side 26 is the side of the directory which extends between the top and bottom edges of the pages and thus side 26 is the side opposite to the bound edge. Index means 25 may be constructed of any suitable material such as wood, paperboard, plastic or the like, and has the top thereof shaped to provide a plurality of steps 27. The directory is closed with the front or beginning being on top. The bottom of the index means is generally level with the bottom of the directory. The number and height of the steps will be determined by the number and thickness of the index sections of the directory. Thus for example, the highest step or top of the index means may correspond to letter A and be marked accordingly. The distance from step A to step B will depend upon the number of pages in the A section of the directory. Certain letters may be combined, such as for example an E and F as indicated, although these letters may be separated and a step allotted to each such letter.

In many instances, telephone directories have sections at the rear reserved for classified subscribers, the classification being according to business or profession. In such cases, steps may be provided to handle such so-called "red" or "yellow" book sections, such steps carrying appropriate indicia.

It is clear that the dimensions of index means 25 will be determined by the dimensions of the telephone directory of a particular city such as, for example, Chicago. As a rule, telephone directories throughout the United States metropolitan areas have generally similar page dimensions. Apart from this, however, the simplicity of the invention and the ease with which it may be manufactured makes it possible to provide a specially designed construction for different metropolitan areas such as, for example, Chicago, Boston, New York city, and the like.

The construction embodying the present invention may be manufactured economically and if with the passage of time the telephone directory outgrows the particular holder, then a newly designed holder may be readily manufacture and sold. As a rule, however, the variation in dimension of a telephone directory is relatively slow since considerable change in the number of listings is possible by controlling the page margins. Hence in practice, an index holder which is designed for a 1955 directory may be relied upon generally to be satisfactory for quite a number of years.

In order to use the holder, the directory is disposed as indicated with edge 26 thereof against index means 25. The pages of the directory are opened up to the point where the remaining sheets on the right-hand side of the book are generally level with the desired letter of the alphabet. Thus for example, if listings under G are desired, a finger may be disposed at G and all the pages of the directory above the level of the G step may be opened.

Step means 25 may be disposed along bottom or top edges 14 and 15 respectively. In such case, however, the entire complement of index subdivisions may have to be crowded away from the bound edge of the book. The disposition of the index means 25 at edge 11 is preferred.

The index means illustrated and described may have its maximum height equal to the entire thickness of the telephone directory when closed. In such an arrangement, the next to the top step may be level with the first page of the A section.

Instead of having the maximum height of the index means corresponding to A at one end, here illustrated as the top end (Figure 1), it is possible to dispose such maximum step at some intermediate point of the index member such as, for example, the center. This is shown in Figure 5. Then steps B to some letter such as, for example, L could extend successively from the maximum A step in one direction while additional steps from M to Z could extend in the other direction. It is also possible to have the A step in the center and have the B step on one side of A and the C step on the other side of A and then continue with the D step on the one side of A and the E step on the other side of A. In that way, the index member would have a downwardly extending series of steps from the centrally located maximum height.

It is also possible to have the A step at one end of the index means and have the B step at the opposite end of the index means and thus have the steps go back and forth gradually approaching the center with the minimum height step corresponding to Z at approximately the center of the index. This is shown in Figure 6.

It is also possible to have index means 25 physically separate from the book holder.

Referring to Figure 7, there is illustrated a simple means for providing a template to outline steps of desired height. Thus block 35 carries stepped member 36. Member 36 has tapped apertured portions 37 corresponding to each step in the final index means. Bolt 38 is disposed in a tapped aperture and carries adjustable step block 40. The bolt end is attached to block 40 so that the bolt may freely turn with respect to its block but the block is forced to go up or down with the bolt end. When designing an index means, each block 40 is adjusted to the proper height. After all the blocks are adjusted, they constitute a template for making an index member.

What is claimed is:

1. A combined book holder and index means comprising a tray-shaped member upon which a closed book may rest with the rear cover at the bottom, said book having a side where the free edges of the pages are accessible, a unitary stepped index member carried by said tray and adapted to be adjacent the portion of the book where the free edges of the pages are accessible, said index member having a high part at one part thereof which is substantially level with the top index subdivision in the normally closed position of the book, said index means having a plurality of steps distributed along the length thereof extending from said high part to the tray shaped member, said steps corresponding to index subdivisions for the book, each such step being substantially level with the corresponding book index subdivision, said steps carrying appropriate indicia.

2. The construction according to claim 1 wherein said index member is disposed on that portion of the tray adjacent the side of the book which is opposite the bound edge of the book.

References Cited in the file of this patent

UNITED STATES PATENTS

| | | |
|---|---|---|
| 169,536 | Glover | Nov. 2, 1875 |
| 170,959 | Lovell | Dec. 14, 1875 |
| 529,477 | Brown | Nov. 20, 1894 |
| 1,093,867 | Legare | Apr. 21, 1914 |
| 1,524,059 | Scott | Jan. 27, 1925 |
| 2,259,203 | Fleming | Oct. 14, 1941 |
| 2,302,153 | Spinner | Nov. 17, 1942 |
| 2,622,897 | Zenick | Dec. 23, 1952 |
| 2,757,939 | Fenkel | Aug. 7, 1956 |

FOREIGN PATENTS

| | | |
|---|---|---|
| 137,120 | Austria | Apr. 10, 1934 |
| 552,787 | Great Britain | Apr. 23, 1943 |